US010364065B2

(12) United States Patent  (10) Patent No.: US 10,364,065 B2
Raninen et al.  (45) Date of Patent: Jul. 30, 2019

(54) LOGISTICS SYSTEM, AN ADAPTOR PALLET AND A LOAD CARRIER

(71) Applicant: K. Hartwall Oy Ab, Söderkulla (FI)

(72) Inventors: Jussi Raninen, Söderkulla (FI); Mikko Jarvi, Söderkulla (FI)

(73) Assignee: K. Hartwall Oy Ab, Söderkulla (FI)

( * ) Notice: Subject to any disclaimer, the term of this patent is extended or adjusted under 35 U.S.C. 154(b) by 0 days.

(21) Appl. No.: 15/722,862

(22) Filed: Oct. 2, 2017

(65) Prior Publication Data

US 2018/0093796 A1   Apr. 5, 2018

(51) Int. Cl.
    *B65D 19/44*   (2006.01)
    *B62B 3/00*    (2006.01)
    *B65D 19/00*   (2006.01)
    *B65D 19/38*   (2006.01)

(52) U.S. Cl.
    CPC ............ *B65D 19/44* (2013.01); *B62B 3/002* (2013.01); *B62B 3/008* (2013.01); *B65D 19/0095* (2013.01); *B65D 19/38* (2013.01); *B62B 2207/02* (2013.01); *B65D 2519/00273* (2013.01); *B65D 2519/00293* (2013.01); *B65D 2519/00323* (2013.01); *B65D 2519/00333* (2013.01); *B65D 2519/00815* (2013.01)

(58) Field of Classification Search
    CPC ........ B65D 19/44; B65D 19/42; B65D 19/40; B65D 19/0095
    USPC ............................. 108/55.3, 55.1, 55.5, 51.11
    See application file for complete search history.

(56) References Cited

U.S. PATENT DOCUMENTS 5,133,453 A  *  7/1992  Fritze .................... B65D 19/44
                                                    206/335
5,676,063 A  *  10/1997  Wallace ............ B65D 19/0093
                                                    108/55.3
(Continued)

FOREIGN PATENT DOCUMENTS

DE        8704879 U1    5/1987
DE    202004017634 U1   2/2005
(Continued)

OTHER PUBLICATIONS

Finnish Patent and Registration Office; Search Report; dated Apr. 4, 2017; 2 pgs; Helsinki, Finland.

*Primary Examiner* — Jose V Chen
(74) *Attorney, Agent, or Firm* — Seppo Laine Oy

(57) ABSTRACT

A logistics system, adaptor pallet and load carrier are proposed for transporting many load carriers at once. The novel logistics system includes at least one load carrier and an adaptor pallet for receiving a plurality of such load carriers. The adaptor pallet includes a detent, which has a deployed configuration, in which the detent is configured to prevent lateral movement of the at least one load carrier, and a released configuration, in which the detent is configured to allow lateral movement of the at least one load carrier. The logistics system also includes a locking interface having a first counterpart fixed to the adaptor pallet and a second counterpart provided to the at least one load carrier. The first and second counterpart have been configured to engage each other, when the at least one load carrier is in the transporting position on the adaptor pallet so as to prevent rotation movement of the at least one load carrier in respect to the adaptor pallet.

10 Claims, 6 Drawing Sheets

(56) References Cited

U.S. PATENT DOCUMENTS

| | | | | |
|---|---|---|---|---|
| 5,772,369 | A * | 6/1998 | Lerman | B65B 11/025 108/55.5 |
| 5,911,179 | A * | 6/1999 | Spiczka | B65D 19/0095 108/51.11 |
| 6,126,131 | A * | 10/2000 | Tietz | B25H 3/00 108/55.3 |
| 6,379,107 | B1 * | 4/2002 | Iwasaki | B65D 19/44 108/55.3 |
| 6,602,032 | B2 * | 8/2003 | Arai | B65D 19/385 108/55.1 |
| 6,817,578 | B1 * | 11/2004 | Garcia | B65D 19/0002 244/118.1 |
| 6,983,704 | B1 * | 1/2006 | Ness | E21B 21/01 108/55.3 |
| 9,611,070 | B2 * | 4/2017 | Ma | B65D 88/005 |
| 9,969,414 | B2 * | 5/2018 | Kelly | B62B 3/005 |
| 2002/0195027 | A1 * | 12/2002 | Mallan | B65D 19/44 108/55.3 |
| 2004/0188307 | A1 * | 9/2004 | Beck | B65D 19/12 206/503 |
| 2010/0101460 | A1 * | 4/2010 | Kelly | F16N 31/002 108/55.3 |
| 2013/0327735 | A1 * | 12/2013 | Gronholm | B65D 19/0095 211/85.8 |
| 2014/0033956 | A1 | 2/2014 | Kelly | |
| 2014/0366783 | A1 * | 12/2014 | Kosonen | B65D 19/0002 108/51.11 |
| 2015/0033992 | A1 * | 2/2015 | Marriott | B65D 19/0026 108/50.11 |
| 2015/0203138 | A1 * | 7/2015 | Hassell | B62B 3/04 280/47.34 |
| 2016/0122078 | A1 * | 5/2016 | Clark | B65G 1/08 414/273 |
| 2016/0311453 | A1 * | 10/2016 | Thompson | B60P 3/077 |
| 2017/0320651 | A1 * | 11/2017 | Chen | B65D 19/0091 |

FOREIGN PATENT DOCUMENTS

| | | |
|---|---|---|
| DE | 202011106718 U1 | 1/2012 |
| DE | 202012007740 U1 | 9/2012 |
| DE | 102012001503 A1 | 8/2013 |
| DE | 102014115287 A1 | 4/2016 |
| EP | 0450732 A1 | 10/1991 |
| EP | 2671814 A1 | 12/2013 |
| GB | 2236719 A | 4/1995 |
| WO | 200909090309 A1 | 7/2009 |

* cited by examiner

LOGISTICS SYSTEM, AN ADAPTOR PALLET AND A LOAD CARRIER

FIELD

The present disclosure relates to logistics equipment. In particular, the present disclosure relates to a system for transporting a plurality of wheeled load carriers on an adaptor pallet as well as to an adaptor pallet and wheeled load carrier for the same purpose. More specifically, the present disclosure relates to a logistics system, an adaptor pallet, and to a load carrier.

BACKGROUND

Goods of relatively small size are typically transported using load carriers which are platforms or boxes preferably mounted on wheels or castors. The platforms may include side walls, in which case they are typically referred to as crates or roll containers, or not include side walls, in which case they are typically referred to as trays, dollies or trolleys. Wheeled load carriers are typically favoured in the logistics of heavy objects. Goods are stored in containers that fit into the receptive platform. Upon transportation or temporary storage, the usually boxlike containers are stacked onto dollies, the wheels of which enable easy handling by hand. The shape and size of the dollies are usually standardized to conform advantageously to industrial container models. While the wheeled load carriers may be moved about by hand, there is also a need to transport a plurality of wheeled load carriers at once. Such a need occurs e.g. when loading or unloading a trailer or a lorry. If a trailer is loaded one wheeled load carrier at a time, the long duration of the operation consumes valuable docking time not to mention inflicted gratuitous vehicle idle time. Also, when transported individually, the wheeled load carriers require thorough and tedious trussing up to prevent unintended movement within the load space. To tackle these disadvantages, adaptor pallets have been developed. These adaptor pallets are usually rather flat and include a deck that has an upper support surface to accommodate a plurality of wheeled load carriers, tracks to guide the wheels thereof and receptive slots to receive the lifting forks of a forklift.

There is also a need to secure the load carriers to the adaptor pallet. Many different securing devices have been developed over time but the locking mechanisms vary depending on the requirements concerning usability, level of security, etc. A prominent type of an adaptor pallet has an open loading end, whereby the wheeled load carriers are secured to the pallet by operating a locking device, preferably a foot-operated locking device. Such adaptor pallets enjoy the benefit of not requiring a separate strap to secure the cargo. One such adaptor pallet has been disclosed in EP 2671814 A, which is particularly advantageous in that the pallet does not require a separate manipulation mechanism for toggling the locking device between an open and closed state. This makes the structure very user-friendly, light and robust. The disclosed locking mechanism makes contact with the chassis of the roll container from below and simply limits the rolling movement of the wheeled load carrier so as to prevent the wheeled load carrier from rolling off the adaptor pallet.

Other interpretation of an adaptor pallet has been disclosed in DE 102009052869 B4 proposing locking tabs that may be toggled between an engaging state and a retracted state. When in the engaging state, the tabs protrude out of the side of the lifting tunnel to grab the wheeled load carrier thus limiting the movement of the wheeled load carrier in several dimensions. When in the retracted state, the tabs are retracted inside the lifting tunnel so as to allow rolling movement of the wheeled load carriers. While very sturdy, the adaptor pallet of DE 102009052869 B4 requires quite a complex manipulation mechanism to operate the locking tabs, which adds weight to the adaptor pallet and makes it susceptible for mechanical failures.

It would therefore be desirable to provide an adaptor pallet, which would capture the usability, lightness and simplicity of the adaptor pallet of EP 2671814 A, but exhibit the securing properties of the adaptor pallet of DE 102009052869 B4. It is therefore an object of at least some of the embodiments herein described to provide a user-friendly and light yet sturdy alternative to transporting may load carriers at once.

SUMMARY

The present disclosure proposes a novel logistics system for that very purpose. The logistics system includes at least one load carrier, such as a wheeled load carrier, and an adaptor pallet for receiving a plurality of such load carriers and for transporting the plurality of such load carriers in a transporting position. The adaptor pallet comprises a detent, which has a deployed configuration and a released configuration. In the deployed configuration the detent is configured to prevent lateral movement, such as rolling movement, of the at least one load carrier. In the released configuration the detent is configured to allow the lateral movement of the at least one load carrier. The logistics system also includes a locking interface having a first counterpart fixed to the adaptor pallet and a second counterpart provided to the at least one load carrier. The first and second counterpart have been configured to engage each other, when the at least one load carrier is in the transporting position on the adaptor pallet so as to prevent rotation movement of the at least one load carrier in respect to the adaptor pallet.

A novel adaptor pallet is also disclosed for the same purpose. The adaptor pallet has a fixed inter-engagement member, which serves as a first counterpart for engaging second counterpart provided to a wheeled load carrier so as to prevent rotation movement of the load carrier in respect to the adaptor pallet.

In addition, a novel load carrier is disclosed for the same purpose. The load carrier includes an inter-engagement member, which serves as a second counterpart for engaging a first counterpart fixed to an adaptor pallet so as to prevent rotation movement of the load carrier in respect to the adaptor pallet.

Considerable benefits are gained with aid of the novel proposition. By providing on the one hand the adaptor pallet and on the other hand the load carrier with cooperatively inter-engaging counterparts, a further attachment may be made between the adaptor pallet and the load carrier. That way the detent on the adaptor pallet may prevent lateral movement of the dollies, whereas the locking interface may introduce another limitation to the degrees of freedom of the load carrier. This benefit becomes particularly apparent, when the load carrier is a wheeled load carrier, wherein the lateral movement is rolling movement on the tracks of the adaptor pallet. For example, if the male counterpart extends along the tracks of the adaptor pallet, rotation of the adaptor pallet is prevented particularly about the contact point between the detent and the wheeled load carrier. Further benefits of the novel proposition will become apparent in the detailed description of the embodiments.

BRIEF DESCRIPTION OF THE DRAWINGS

In the following, certain exemplary embodiments are described in greater detail to the accompanying drawings, in which.

DETAILED DESCRIPTION OF EXEMPLARY EMBODIMENTS

The embodiments herein described include a locking interface provided to the logistics system; one counterpart for each component in the system, namely one for the adaptor pallet and one for the load carrier. The counterparts are designed to fit each other in a manner that prevents the rotation of the load carrier, i.e. tipping, in addition to the prevention provided by the detent. The logistics system proposed herein relates to adaptor pallets designed to receive and transport load carriers of various sorts. The illustrated examples feature wheeled load carriers, such as roll containers and dollies. The same principles will also apply to load carriers not comprising wheels. Boxes, crates, etc. with or without skids can also be loaded onto the novel adaptor pallet. However, if the load carrier does not include wheels, it would be beneficial to supply wheeled runners (not shown) to the tracks of the adaptor pallet for facilitating easy loading and unloading of the load carrier. It should therefore be borne in mind that the wheeled motion between the adaptor pallet and the load carrier can be reversed without departing from the inventive concept defined by the independent claims.

Figure 1:
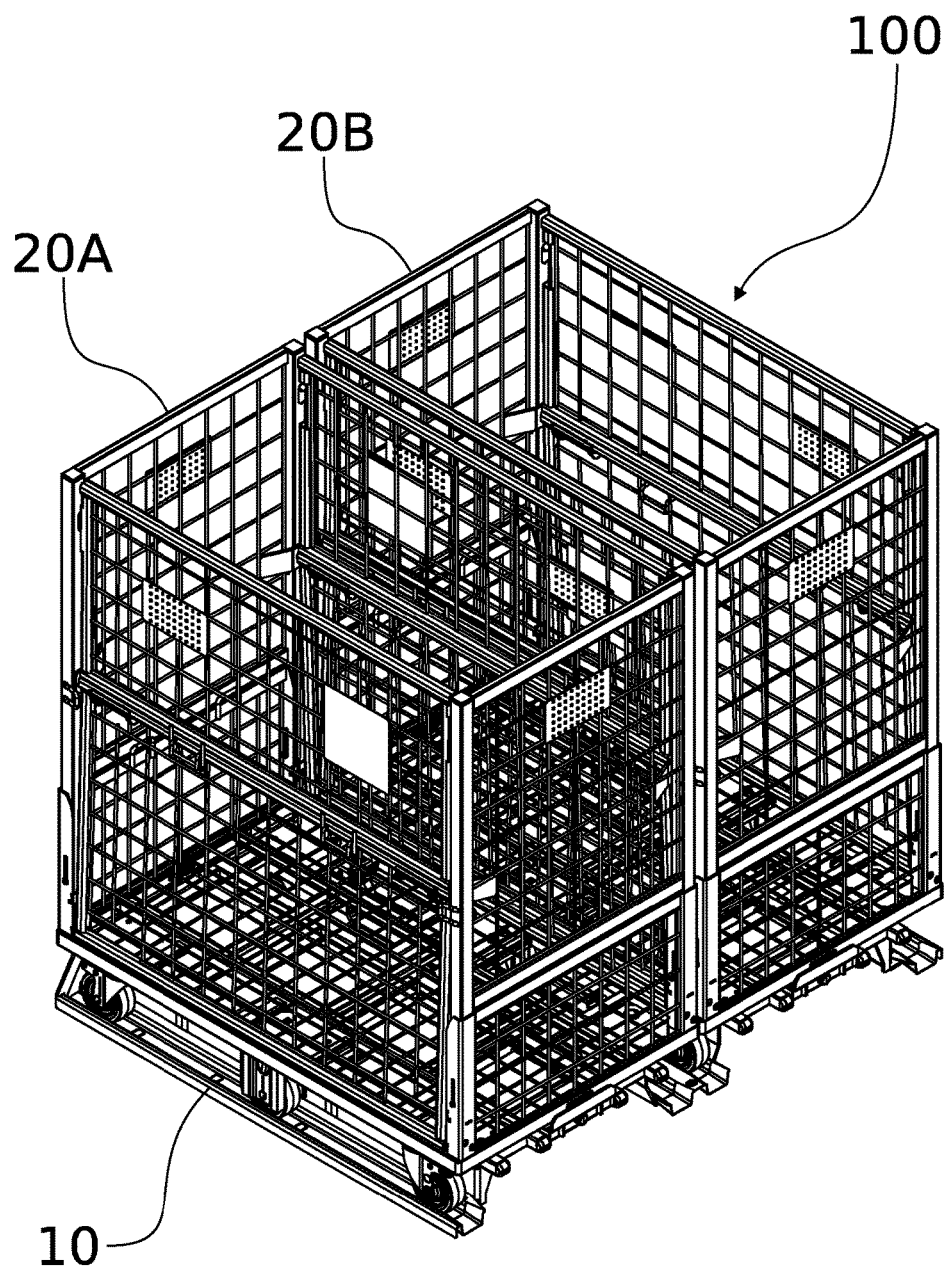
FIG. 1 illustrates an isometric top view of a logistics system in accordance with at least some embodiments of the present invention.

Let us first study FIG. 1, which shows a logistics system 100 according to one embodiment. The logistics system 100 includes an adaptor pallet 10 hosting two wheeled load carriers 20, namely a first wheeled load carrier 20A on the left and a second wheeled load carrier 20B on the right. In the illustrated example the wheeled load carriers take the form of a roll container, but the same principles apply similarly to other wheeled load carriers, such as dollies, trollies, trucks, etc. In addition, the example of FIG. 1 features an adaptor pallet 10, which is designed to receive and carry two wheeled load carriers 20A, 20B in a parallel formation. The adaptor pallet could alternatively be designed to accommodate more wheeled load carriers in a different formation. The load carriers 20A, 20B are shown in a secured transporting position, in which the load carriers 20A, 20B have assumed the rearmost position on the adaptor pallet 10 and have been secured to the adaptor pallet by a detent and a locking interface, which will be discussed in greater detail in the following.

Figure 2:
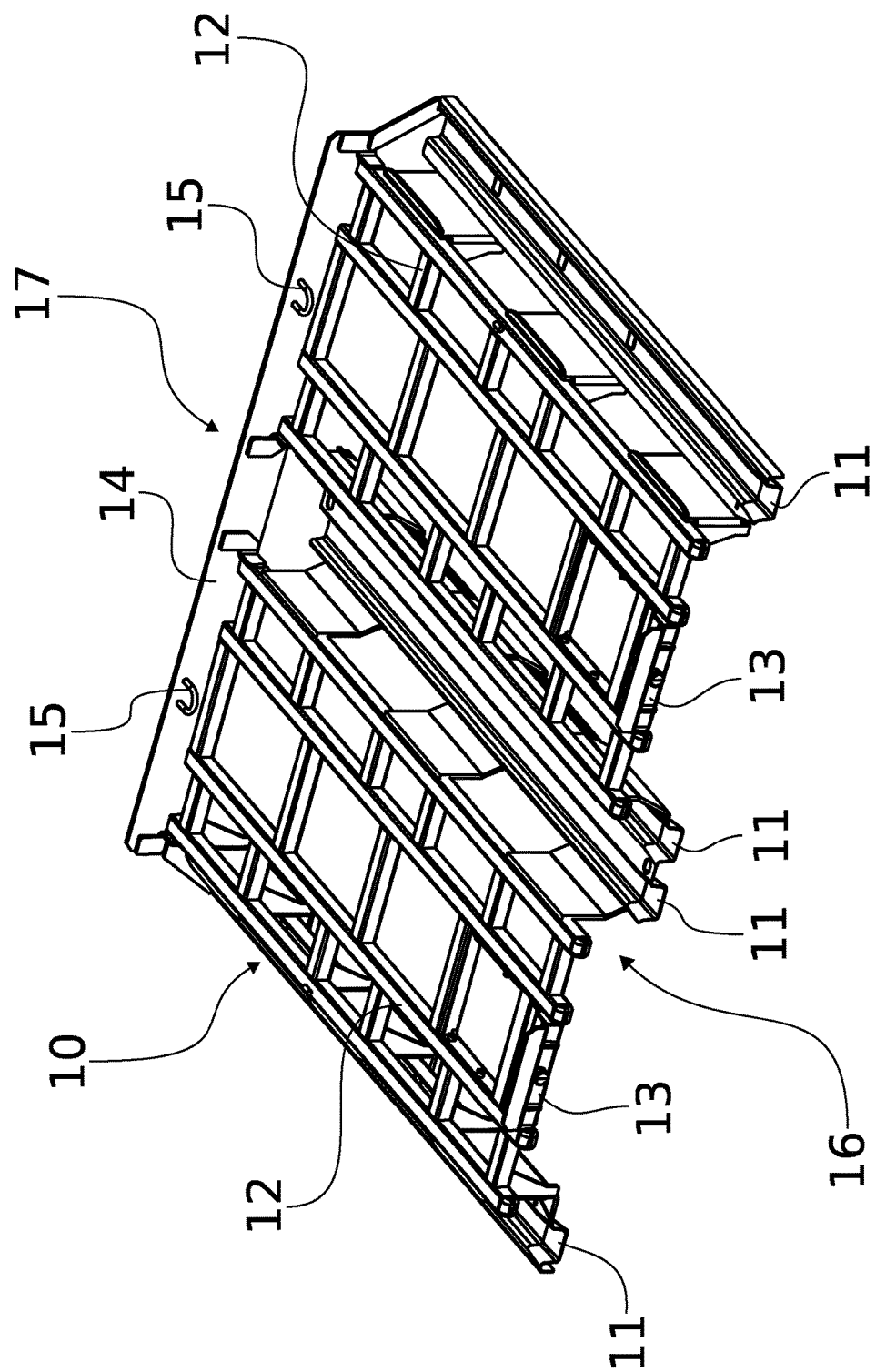
FIG. 2 illustrates an isometric top view of the adaptor pallet of FIG. 1 with the detents in deployed configuration.

FIG. 2 shows an empty adaptor pallet 10 as an isometric top view. Firstly, FIG. 2 shows that the adaptor pallet 10 includes four tracks 11 arranged parallel to each other to receive the wheels of two adjacent wheeled load carriers 20 along the longitudinal dimension of the adaptor pallet 10. The four tracks form two pairs of tracks; one pair of tracks (on the left) form the tracks to receive one wheeled load carrier and the other pair of tracks (on the right) form the tracks to receive the other wheeled load carrier. The neighbouring tracks of the two pairs of tracks, i.e. the tracks at the center, may be separate as shown in FIG. 2 or integrated (not shown). Between the tracks 11 in each pair there is arranged a lifting tunnel 12 for receiving a lifting fork of a forklift. The lifting tunnel 12 may be a beam structure provided at an elevated level from the level of the tracks 11 to ensure proper ground clearance for the lifting forks. The lifting tunnels 12 also serve as an assembly point for detents 13, which are used to prevent rolling movement of the wheeled load carriers 20. A detent 13 is therefore provided to each lifting tunnel 12, whereby the example of FIG. 2 includes two detents 13 both provided to the loading end 16 of the adaptor pallet 10. The detents 13 are pivotably attached to the lifting tunnels 12 so as to be rotated between a deployed configuration and a released configuration. In the deployed configuration as shown in FIG. 2 the detent 13 extends in the longitudinal direction of the adaptor pallet 10 along the lifting tunnel 12, wherein the upwardly extending tab of the detent 13 at the loading end 16 of the adaptor pallet 10 creates a sill for the wheeled load carrier 20 thus preventing the wheeled load carrier 20 from rolling off the adaptor pallet 10. In particular, the tab of the detent 13 makes contact with the chassis 21 or wheel 22 of the wheeled load carrier 20 for preventing escape (cf. FIG. 3). When a release button on the detent 13 is depressed, the detent 13 is released from the horizontal deployed configuration to fall with aid of gravity into the released configuration, in which the tab is descended from the upright position as the detent 13 is rotated about an axis provided to the other end of the detent 13 opposing the tab. The afore-mentioned publication EP 2671814 A discloses an example of a suitable detent in great detail. That said, it is also possible to provide an alternative detent for arresting rolling movement, such as a removable securing pin, plate, etc. (not shown).

The opposing end to the loading end 16, namely the closed end 17, includes a stopper 14. In the shown example, the stopper 14 takes the form of a back plate. One purpose of the stopper 14 is to permanently limit the movement of the wheeled load carriers 20 in the longitudinal dimension of adaptor pallet 10. Another purpose of the stopper 14 is to serve as an installation point for inter-engagement member 15 provided to the adaptor pallet 10 for forming a second securing connection between the adaptor pallet 10 and the wheeled load carrier 20. As stated before, the logistics system 100 includes an adaptor pallet 10, at least one wheeled load carrier 20 and a locking interface with two counterparts divided between the adaptor pallet 10 and wheeled load carrier 20. The counterpart of the adaptor pallet 10, namely the first counterpart, is fixed to the closed end 17 of the adaptor pallet 10, more specifically to the stopper 14. To elaborate, the adaptor pallet 10 includes one first counterpart for each wheeled load carrier, which in the example of FIG. 2 is two. The first counterpart 15 of the locking interface of the logistics system 100 takes the form of inter-engagement member fixed to the adaptor pallet 10. In the illustrated embodiment, the inter-engagement member 15 is a male counterpart that extends from the closed end 17 towards the loading end 16 along the longitudinal dimension of the adaptor pallet 10. In other words, the male counterpart extends parallel to the tracks 11. The inter-engagement member 15 may exhibit, for example, a loop shape, such as shown in FIG. 2. The generally C shape has the benefit of being easily inserted and retracted from the wheeled load carrier 20. Other foreseeable male counterpart shapes include elongated beams with or without reverse taper shapes to establish a threshold for a snap-on fit.

Figure 3:
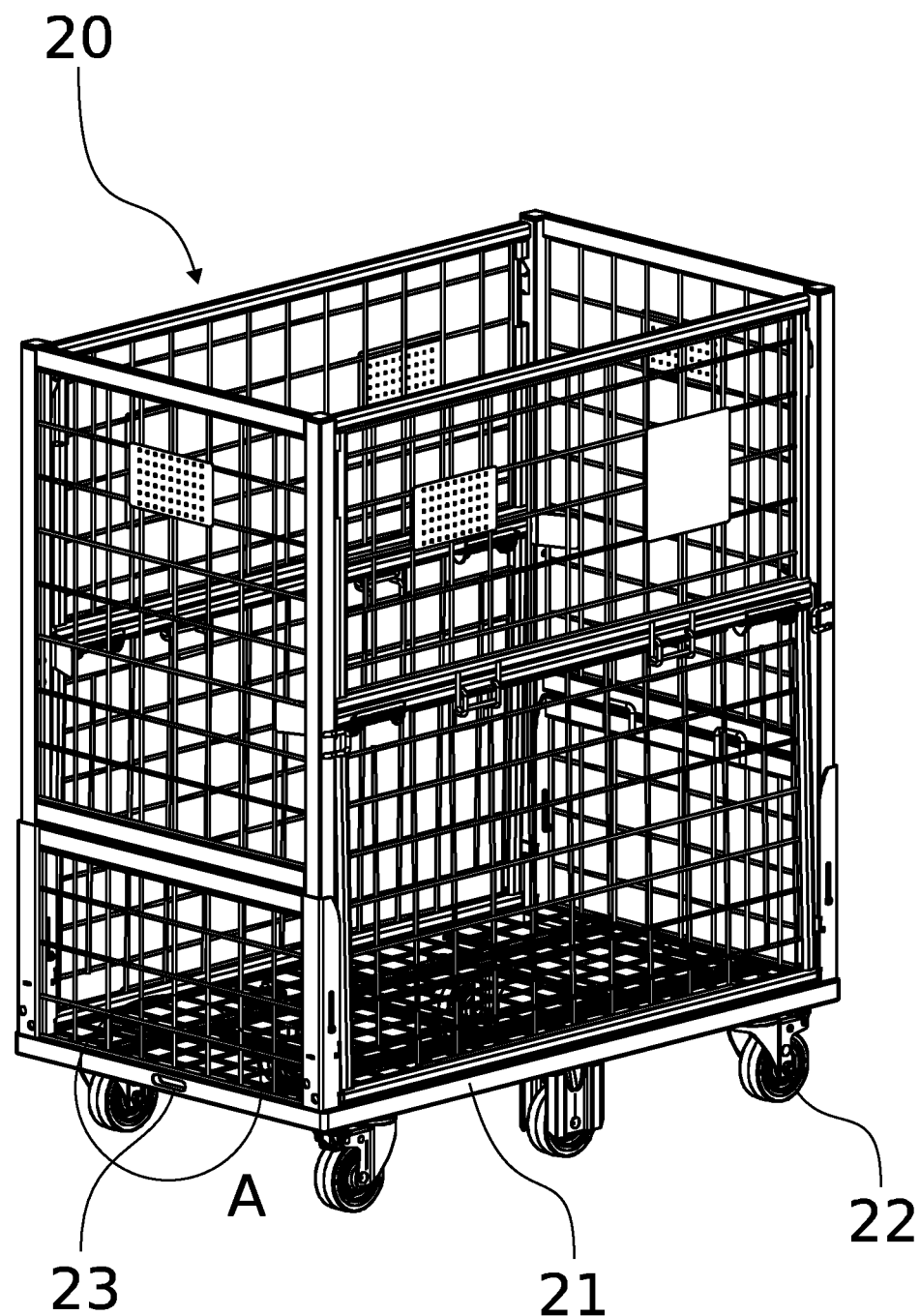
FIG. 3 illustrates an isometric side view of the adaptor pallet of FIG. 1 with the detents in deployed configuration.
Figure 4:
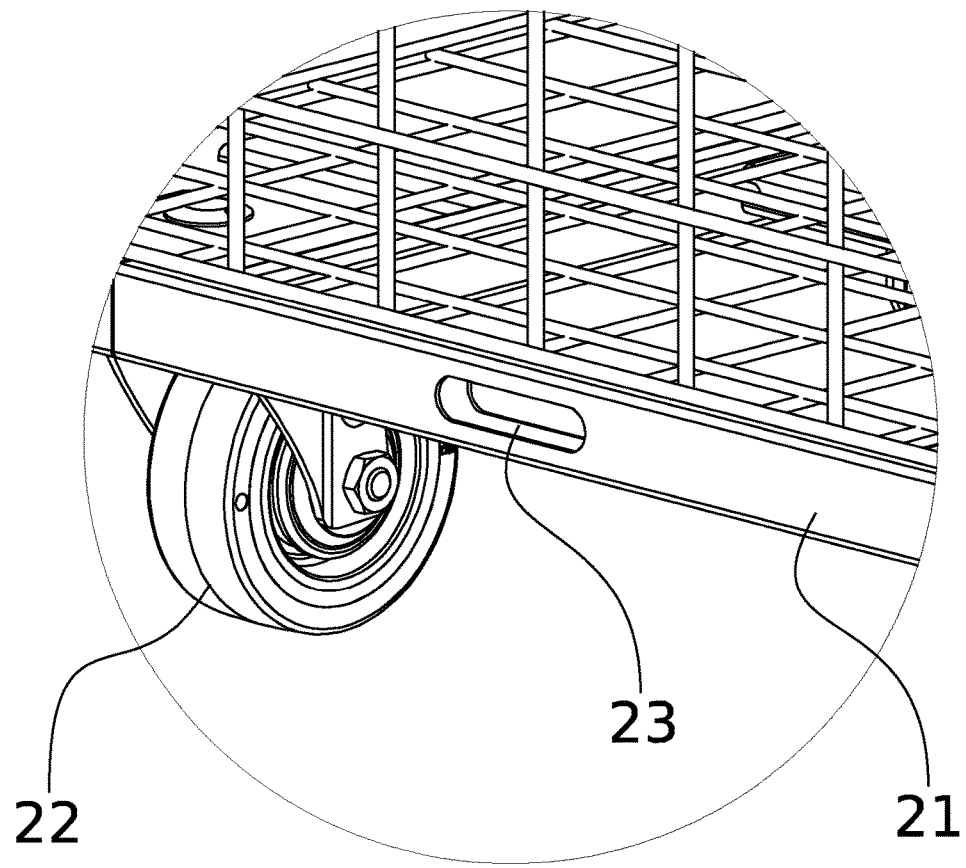
FIG. 4 presents a detailed view of the highlighted area A of FIG. 3.

Turning now to FIG. 3 which shows an exemplary wheeled load carrier 20. The wheeled load carrier 20 includes a chassis 21 and wheels 22 attached thereto. The chassis 21 also hosts upwardly extending side walls making the herein exemplified wheeled load carrier a roll container. The chassis 21 has also been provided with an inter-engagement member 23, which serves as the second counterpart in the locking interface of the logistics system 100. As shown in greater detail in FIG. 4, the inter-engagement member 23 is a female counterpart to the inter-engagement member 15 of the adaptor pallet 10. In other words, the inter-engagement member 23 of the wheeled load carrier 20 and the inter-engagement member 15 of the adaptor pallet 10 form the cooperating first and second counterparts of the locking interface of the logistics system 100, respectively. As also shown in FIG. 4, the exemplary inter-engagement member 23 is an opening in the chassis 21 specifically designed to receive and hold the male inter-engagement member 15 of the adaptor pallet 10. The female counterpart of the locking interface may be provided to the wheeled load carrier 20 in a different shape as shown in FIG. 4, for example by including a counter shape to the reverse taper shape (not shown) of the male inter-engagement member 15 of the adaptor pallet 10 to establish a threshold for a snap-on fit.

Figure 5:
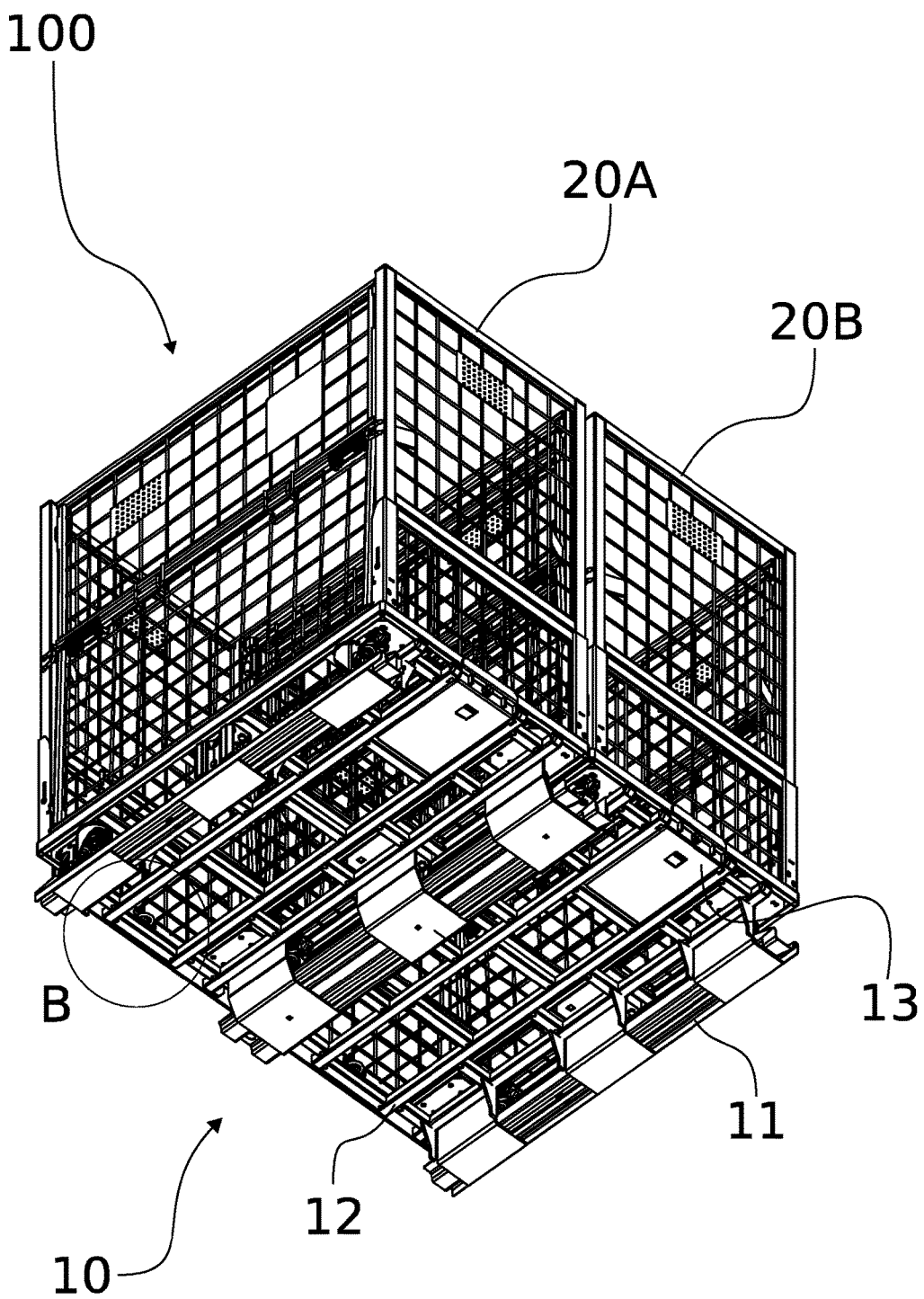
FIG. 5 illustrates an isometric bottom view of the logistics system of FIG. 1.
Figure 6:
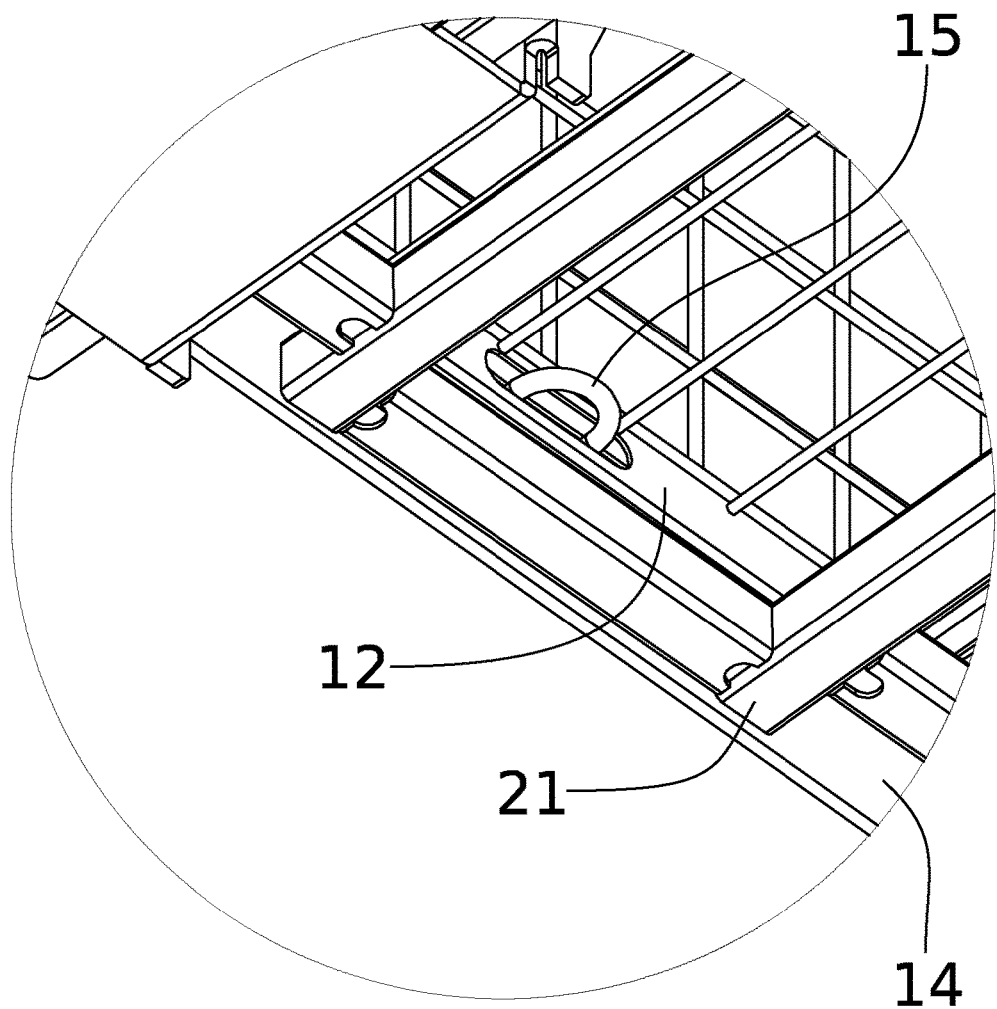
FIG. 6 presents a detailed view of the highlighted area B of FIG. 5.

FIGS. 5 and 6 show the locking interface of the logistics system 100 in full use. FIG. 5 shows the two wheeled load carriers 20A, 20B in the secured transporting position, in which one end of the wheeled load carriers 20A, 20B engage the stopper 14 at the closed end 17 of the adaptor pallet 10 and the other end of the wheeled load carriers 20A, 209 engage the detents 13 at the loading end 16 of the adaptor pallet 10. The detail view of FIG. 6 reveals how the inter-engagement member 15 of the adaptor pallet 10, i.e. the male counterpart of the locking interface, extends through the inter-engagement member 23 of the wheeled load carrier 20, i.e. female counterpart of the locking interface. The male counterpart 15 is dimensioned to extend along the entire depth of the frame beam of the chassis 21 of the wheeled load carrier 20 so as to ensure a sufficient contact surface between the two. As the male counterpart 15 extends through the chassis 21 of the wheeled load carrier 20 along the tracks 11, the end of the wheeled load carrier 20 is prevented from lifting from the adaptor pallet 10, when the logistics system 100 is subjected to acceleration during heavy braking on a forklift, for example. Thus, rotation of the wheeled load carrier 20 is prevented about the detent 13 is prevented, which decreases the risk of tipping. On the other hand the width of the C shaped inter-engagement member 15 of the adaptor pallet 10 provides support, which prevents the wheeled load carrier 20 from tipping over about an axis parallel to the longitudinal dimension of the adaptor pallet 10, i.e. from tipping to the side. Accordingly, the locking interface improves the stability of the otherwise simple and light logistics system 100.

Naturally, it would be possible to reverse the locking interface shown in the FIGURES. While it is possible to equip the wheeled load carrier with a male inter-engagement member and the adaptor pallet with a female inter-engagement member, the illustrated alternative is of particular interest because it minimizes the outer dimensions of the wheeled load carrier. According to an alternative embodiment (not shown), the inter-engagement member of the adaptor pallet is a grabber, which is configured to grab a cooperating inter-engagement member, such as a horizontal wire, arranged to the end of the load carrier facing the closed end of the adaptor pallet, when the load carrier has assumed the transportation position on the adaptor pallet. The grabber may take the form of a claw extending from the closed end of the adaptor pallet towards the loading end. The corresponding counterpart on the load carrier may be arranged inside the peripheral frame beam of the side wall so that the counterpart does not increase the outer dimensions of the load carrier. The male inter-engagement member on the adaptor pallet may be constructed as an elastically deformable member allowing for a repeated engagement and disengagement with the counterpart on the load carrier simply by pushing and pulling the load carrier on the adaptor pallet. The male inter-engagement member may be relatively short but wide, such as a lip, to provide a sufficient contact surface between the counterparts. A wide male inter-engagement member or lip may extend across the closed end of adaptor pallet so that different portions of a single inter-engagement member may form the locking function with several load carriers at once.

Another option to provide a locking interface to the logistics system would be to employ two male counterparts that fit each other such as two protuberances featuring mutually engaging reverse taper forms, e.g. two facing claws. Yet another option would be to provide the under surface of the chassis or wheel plate of the load carrier with a protuberance and the top surface of the adaptor pallet with a corresponding longitudinal groove, which would allow longitudinal movement of the load carrier but prevent rotation about an axis parallel to the longitudinal dimension of the adaptor pallet.

The use of the logistics system 100 is simple. To load the adaptor pallet 10, the detents 13 are released from the deployed configuration by depressing the release button, which releases the detents 13 to drop into the angled released position. Now the tabs on the detents 13 no longer prevent the wheeled load carriers 20 from rolling along the tracks 11. The wheeled load carriers 20A, 20B are loaded onto the adaptor pallet 10 by simply rolling them along the tracks 11 and in the longitudinal dimension of the adaptor pallet 10 until they make contact with the stopper 14 at the closed end 17 of the adaptor pallet 10, which is the transporting position of the wheeled load carrier. During the approach the female counterpart 23 of the locking interface on the wheeled load carrier 20 will assume position around the male counterpart 15 of the locking interface on the adaptor pallet 10. When the wheeled load carrier 20 has reached the rearmost position on the adaptor pallet 10, the inter-engagement member 15 of the adaptor pallet 10 is fully inserted into the inter-engagement member 23 of the wheeled load carrier 20. Because the insertion direction is parallel to the longitudinal dimension of the adaptor pallet 10, i.e. to the loading direction, the engagement between the counterparts of the locking interface of the logistics system is achieved further input from the operator.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In this description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

The invention claimed is:

1. A logistics system comprising:
   at least one wheeled load carrier,
   an adaptor pallet for receiving a plurality of such load carriers and for transporting the plurality of such load carriers in a transporting position, the adaptor pallet configured to receive the plurality of wheeled load carriers in a rolling fashion and comprising a detent, which has:
      a deployed configuration, in which the detent is configured to prevent lateral movement of the at least one load carrier and configured to prevent rolling movement of the at least one wheeled load carrier, and a released configuration, in which the detent is configured to allow lateral movement of the at least one load carrier, and
   a locking interface comprising:
      a first counterpart fixed to the adaptor pallet, and
      a second counterpart provided to the at least one load carrier,
   wherein the first and second counterpart of the locking interface have been configured to engage each other, when the at least one load carrier is in the transporting position on the adaptor pallet so as to prevent rotation movement of the at least one load carrier in respect to the adaptor pallet and wherein
   the adaptor pallet comprises a plurality of parallel tracks for receiving the wheels of the plurality of wheeled load carriers, and
   the first and second counterpart forming the locking interface exhibit inter-engaging male and female shapes, which male shape is configured to extend in a direction parallel to an extending direction of the tracks of the adaptor pallet.

2. The system according to claim 1, wherein:
   the adaptor pallet has been provided with the male counterpart serving as the first counterpart of the locking interface, and wherein
   the load carrier has been provided with a female counterpart serving as the second counterpart of the locking interface.

3. The system according to claim 1, wherein the first and second counterpart of the locking interface are fixed and therefore stationary in respect to the adaptor pallet and load carrier, respectively.

4. The system according to claim 1, wherein:
   the adaptor pallet comprises:
      a loading end for introducing the load carriers onto the adaptor pallet,
      a closed end opposing the loading end, and wherein
   the first counterpart of the locking interface is provided to a closed end of the adaptor pallet such that the first and second counterpart of the locking interface are arranged to engage with each other, when the load carrier reaches the closed end and without further input from an operator.

5. The system according to claim 4, wherein the detent is provided to the loading end of the adaptor pallet and configured to be toggled between the deployed and released configuration through a rotation movement.

6. The system according to claim 4, wherein the closed end of the adaptor pallet comprises a fixed stopper.

7. An adaptor pallet for transporting a plurality of wheeled load carriers, the adaptor pallet configured to receive the plurality of wheeled load carriers in a rolling fashion and comprising a fixed interengagement member serving as a first counterpart for engaging a second counterpart provided to a load carrier of said plurality of load carriers so as to prevent rotation movement of the load carrier in respect to the adaptor pallet, where a detent is configured to prevent rolling movement of at least one of said plurality of wheeled load carriers, when the detent is in a deployed configuration, and wherein
   the adaptor pallet comprises a plurality of parallel tracks for receiving the wheels of the plurality of wheeled load carriers, and wherein
   the inter-engagement member exhibits an inter-engaging male shape, which is configured to extend in a direction parallel to an extending direction of the tracks of the adaptor pallet.

8. The adaptor pallet according to claim 7, wherein the adaptor pallet comprises:
- a loading end for introducing the plurality of load carriers onto the adaptor pallet,
- a closed end opposing the loading end, and
- a detent, which has:
  - a deployed configuration, in which the detent is configured to prevent lateral movement of the at least one of said plurality of bad carriers, and
  - a released configuration, in which the detent is configured to allow lateral movement of the at least one of said plurality of load carriers, wherein the inter-engagement member of the adaptor pallet has been provided to the closed end thereof for engaging the load carrier, when the load carrier has assumed a transportation position at the closed end of the adaptor pallet.

9. The adaptor pallet according to claim 8, wherein the detent has been provided to the loading end of the adaptor pallet.

10. The adaptor pallet according to claim 8, wherein the detent is configured to:
- engage a chassis of the wheeled load carrier in the deployed configuration, and to
- be toggled between the deployed and released configuration through a rotation movement.

* * * * *